United States Patent [19]

Smith

[11] Patent Number: 4,553,788
[45] Date of Patent: Nov. 19, 1985

[54] AUTOMATIC AIR BRAKE CONTROL

[76] Inventor: Frank R. Smith, 606 Osage Ct., San Jose, Calif. 95123

[21] Appl. No.: 626,301

[22] Filed: Jun. 29, 1984

[51] Int. Cl.⁴ .......................... B60T 13/00; B60T 8/18
[52] U.S. Cl. ...................................... 303/7; 188/195; 303/13; 303/22 A
[58] Field of Search ............................ 303/22 R, 7–8, 303/13–15, 22 A, 6 C, 6 R, 23, 50–56, 118, 71, 28, 40, 47, 6 M, 9; 188/195, 349, 112, 170, 3 R

[56] References Cited

U.S. PATENT DOCUMENTS

| | | | |
|---|---|---|---|
| 3,155,435 | 11/1964 | Nicholay et al. | 303/40 |
| 3,162,491 | 12/1964 | Van Winsen | 303/6 |
| 3,210,132 | 10/1965 | Alfieri et al. | 303/40 |
| 3,540,219 | 11/1970 | Huruta et al. | 60/54.5 |
| 3,780,837 | 12/1973 | Haydu | 188/195 |
| 4,090,738 | 5/1978 | Bray | 303/7 |
| 4,092,047 | 5/1978 | Amedei et al. | 303/22 R |
| 4,289,358 | 9/1981 | Dufft et al. | 303/22 R |
| 4,348,062 | 9/1982 | Koenig | 303/7 X |
| 4,368,926 | 1/1983 | Bartholomew | 303/7 |
| 4,383,717 | 5/1983 | Bueler | 303/7 |
| 4,410,218 | 10/1983 | Bueler | 303/6 C |

Primary Examiner—Douglas C. Butler
Attorney, Agent, or Firm—Fliesler, Dubb, Meyer & Lovejoy

[57] ABSTRACT

The force applied to brake a towed vehicle (18) is varied in response to the load of the vehicle (18). A signal generating device (38) generates a first signal when the load weighs more than a selected value and a second signal when the load weighs less than such value. Pressure reducing circuitry (46) reduces the pressure supplied in opposition to the biasing of the towed vehicle brake valve (34) when the second signal is generated and does not reduce such pressure when the first signal is generated. A manual override (52) serves for manually overriding the pressure reducer (44) when the signal generating device (38) generates the second signal. This supplies substantially unreduced pressure in opposition to the biasing of the towed vehicle brake valve (34). In this manner, towed vehicles (18) are prevented from being overbraked when empty. The operator may override the system as necessary, e.g., when both vehicles are empty.

9 Claims, 3 Drawing Figures

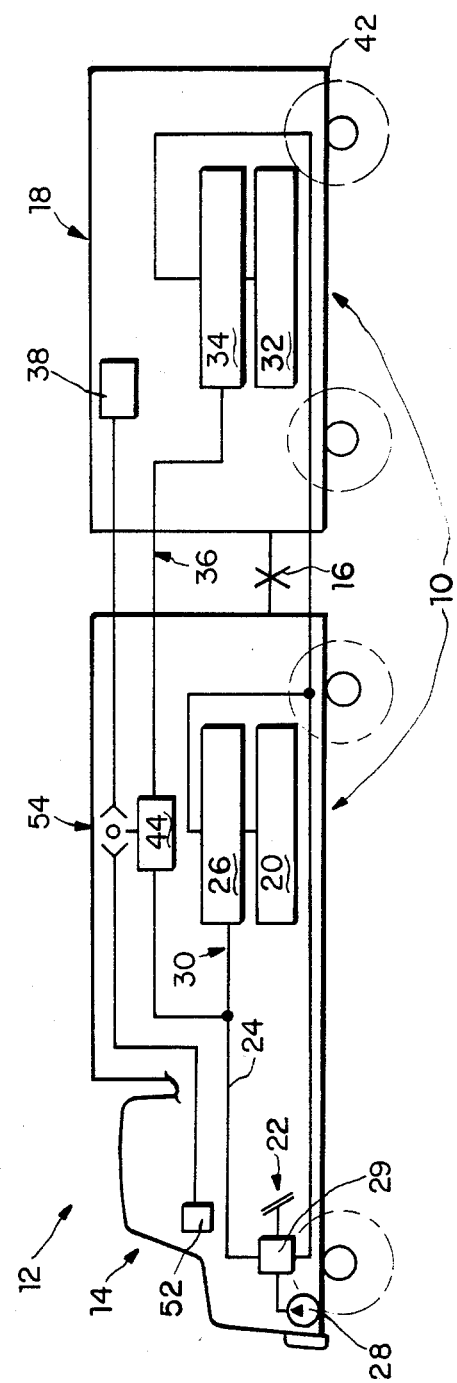
FIG._1

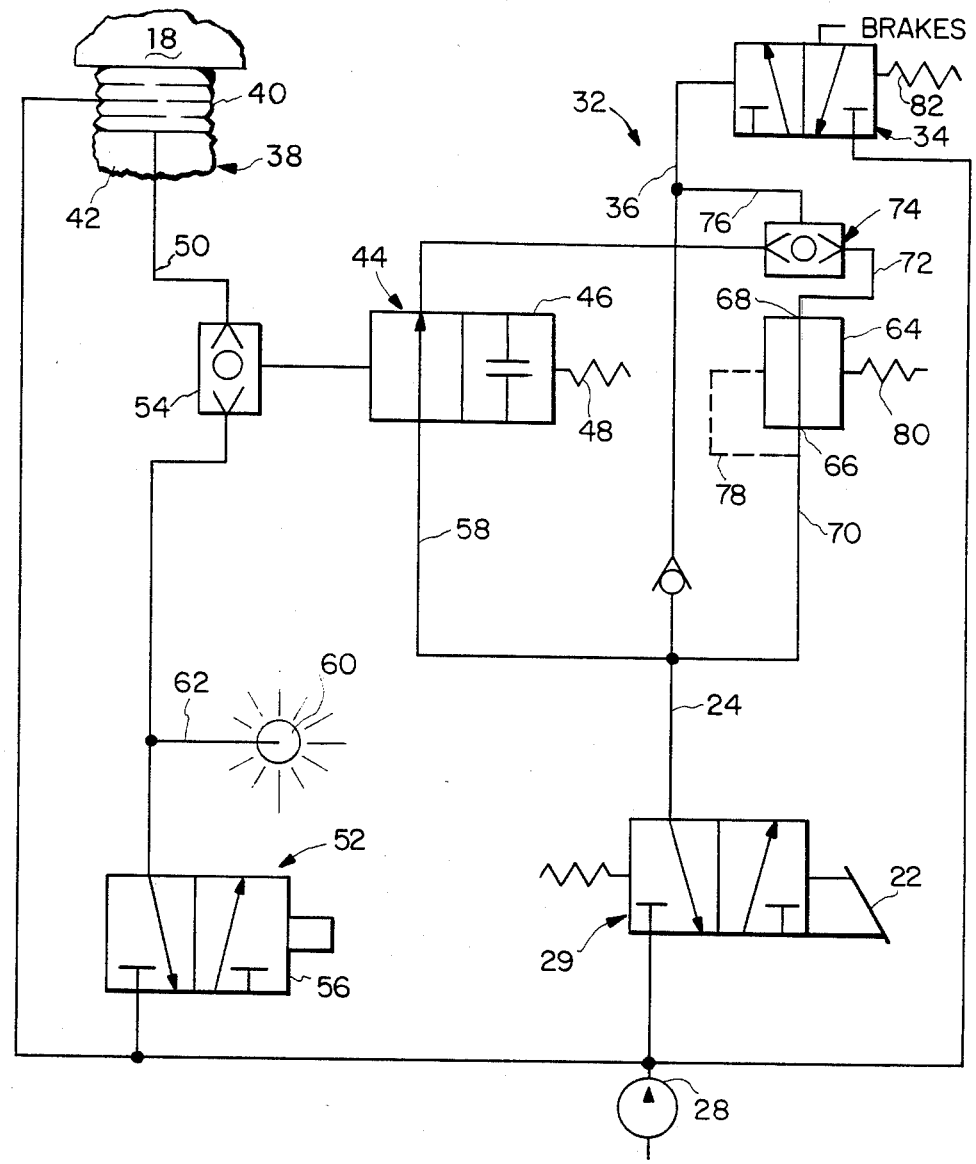
FIG.__2

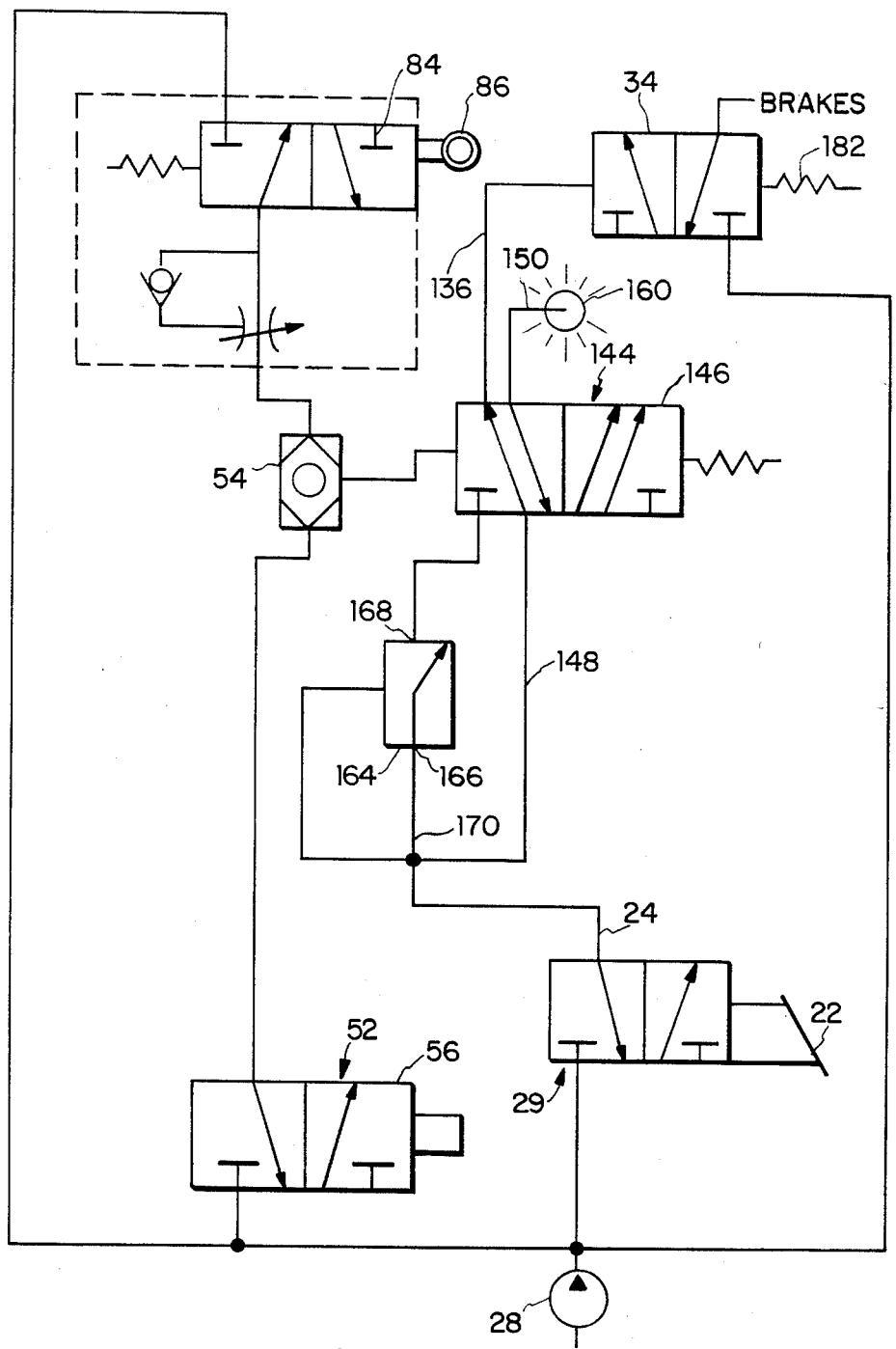
FIG._3

AUTOMATIC AIR BRAKE CONTROL

BACKGROUND OF THE INVENTION

Technical Field

This invention relates to an improved braking apparatus useful with articulated vehicles which include a towing vehicle and a towed vehicle wherein the towed vehicle is much heavier when loaded than when unloaded.

Background Art

Articulated vehicles, particularly tractor-trailor and truck-trailor rigs, are widely utilized for the transportation of goods from one location to another. In some instances, particularly in instances wherein the vehicles are utilized to carry a fluid such as gasoline, the load on the towed vehicle can change significantly during a single run. The brakes of such vehicles must generally be strong enough to stop the vehicles when they are in the fully loaded condition. This requires extremely strong brakes, particularly for the towed vehicle which is often the vehicle bearing the larger portion of the load. This creates a problem in that when the towed vehicle is relatively empty, the brakes of that vehicle are proportionally far stronger than the brakes of the towing vehicle. As a result, brake locking, skidding, fishtailing, loss of control by the driver during braking and other related problems can occur.

The present invention is directed to overcoming one or more of the problems as set forth above.

DISCLOSURE OF THE INVENTION

The present invention is directed to an improvement in a braking apparatus for an articulated vehicle having a towing vehicle attached across an articulated joint to a towed vehicle which is adapted to carry a load. The towing vehicle has a brake system which brakes the vehicle in an amount determined by the pressure of air supplied to such brake system. An operator-controlled brake actuator, e.g., a pedal, is adapted to control the pressure of air supplied from an air supply to the brake system. The towing vehicle has a brake valve which is normally biased in a first or a second position and which, when in the first position, applies pressure to the towing vehicle's brake system. Means are present for applying pressure in opposition to the biasing of the towing vehicle brake valve. The towed vehicle has a brake system which brakes it in an amount determined by the pressure of the air supplied to it. A towed vehicle brake valve is normally biased in either a first or a second position. When it is in the first position, it applies pressure to the towed vehicle brake system. Means are provided for applying the pressure controlled by the brake actuator in opposition to the biasing of the towed vehicle brake valve.

The improvement of the present invention includes modulating means for modulating application of pressure from an air supply. The improvement also includes signal generating means for generating a first signal in response to the weight of the load exceeding a selected value and a second signal in response to the weight of the load being less than the selected value. Pressure reducing means serve for reducing the pressure controlled by the brake actuator and modulated by the modulating means in opposition to the biasing of the towed vehicle brake valve in response to generation of the second signal by the signal generating means and for not reducing the pressure controlled by the brake actuator and modulated by the modulating means in opposition to the biasing of the towed vehicle brake valve in response to generation of the first signal by the signal generating means. Manual overriding means serve for manually overriding the pressure reducing means when the signal generating means generates the second signal for supplying substantially unreduced pressure in opposition to the biasing of the towed vehicle brake valve.

An improved braking apparatus as set forth above has the advantage of automatically adjusting the strength of the brakes on a towed vehicle as a function of the weight of the load carried by that vehicle. Also, the system allows for overriding by the operator whereby maximum brake strength can be applied to the towed vehicle at will. This is necessary in situations where both a towing truck and a towed trailer can carry loads and neither is loaded. In the absence of the overriding feature, the brakes of the truck would be applied relatively much more strongly than those of the trailer (which would be reduced since the trailer would not be bearing a load). All of this is accomplished by utilizing a relatively straightforward means for generating a signal which interacts properly with a conventional brake valve whereby the operator retains full road feel of the application of the brakes whether in their full pressure mode or in a reduced pressure mode. The system is particularly adaptable for retrofitting into existing tractor-trailer and truck-trailer rigs. When such rigs operate with an air spring on the trailer portion, the pressure in the air spring, which is already varied in many of such vehicles dependent upon load, is utilized as pilot pressure to control whether full pressure or reduced pressure is applied to the brake valve.

BRIEF DESCRIPTION OF THE DRAWINGS

The invention will be better understood by reference to the figures of the drawings wherein like numbers denote like parts throughout and wherein:

FIG. 1 illustrates, schematically, a truck-trailer arrangement improved in accordance with the present invention;

FIG. 2 illustrates a first pneumatic circuit in accordance with the present invention; and FIG. 3 illustrates a second pneumatic circuit useful in accordance with an embodiment of the present invention.

BEST MODE FOR CARRYING OUT THE INVENTION

Adverting first primarily to FIG. 1, the present invention is directed to an improvement in a braking apparatus 10 for an articulated vehicle 12 having a towing vehicle 14, e.g., a tractor or a truck, attached across an articulated joint 16 to a towed vehicle 18, e.g., a trailer of the nature adapted to carry a load.

The towing vehicle 14 includes a towing vehicle brake system 20 which brakes the towing vehicle 14 in an amount determined by the pressure of air supplied to it. An operator-controlled brake actuator 22, generally a pedal, is adapted to control supply of an operator-controlled amount of pressure in a conduit 24 for a purpose which will shortly become apparent. A towing vehicle brake valve 26 is normally biased closed. The valve 26, when in open position, modulates and applies pressure from an air supply 28, via pressure modulating means 29, to the towing vehicle brake system 20. In essence, when an operator pushes on the pedal 22, air from the air supply 28 flows, at a pressure modulated by pressure modulating means 29, via the conduit 24 to the brake valve 26 and from thence to the brake system 20. While a single pump is illustrated as comprising the air supply 28, the invention is not limited to such an embodiment. In particular, the term "air supply" is used generally herein and may include as many pumps, accumulators and the like as is convenient or otherwise desirable.

Means 30, in the embodiment illustrated in FIG. 1 a branch conduit, serves for applying the pressure supplied by the brake actuator 22 in opposition to the biasing of the towing vehicle brake valve 26. This serves for modulating application of pressure from the air supply 28 to the towing vehicle brake system 20 in response to the pressure controlled by depression of the brake actuator 22.

The towed vehicle 18 has a towed vehicle brake system 32 which brakes the towed vehicle 18 in an amount determined by the pressure of air supplied to it. A towed vehicle brake valve 34 is normally biased into a closed position. When in the open position, the towed vehicle brake valve 34 modulates and applies pressure, which may be from the same air supply 28 which supplies the towing vehicle 14, to the towed vehicle brake system 32. Means 36 are provided for applying the pressure controlled by the brake actuator 22 and supplied by the modulating means 29 in opposition to the biasing of the towed vehicle brake valve 34 for modulating application of pressure from the air supply 28 to the towed vehicle brake system 32 in response to the pressure supplied by the modulating means 29.

In accordance with the present invention, signal generator means 38 are provided for generating a first signal in response to the weight of the load on the towed vehicle 18 exceeding a selected value and a second signal in response to the weight of the load being less than that selected value. In many instances the towed vehicle 18 can include an air spring 40 which serves for suspending the load above a frame 42 and conventional air spring pressurizing means, (which may be simply the same air supply 28 as provides pressurized air to the towing and towed vehicle brake systems 20 and 32 along with conventional valving) which pressurizes the air spring 40 to a first pressure level in response to the load being suspended above the frame 42 less than a selected distance and to a second pressure level in response to the load being suspended above the frame 42 more than the selected distance. The first pressure level can be used to determine the first signal (generally a pressure signal) generated by the signal generating means 38 and the second pressure level can be used to determine the second signal (generally a pressure signal) generated by the signal generating means 38. In such an instance, the first pressure level is determined by the pressure within the spring 40 when the load is above the selected level and the second pressure level is determined by the pressure in the spring 40 when the load is below the selected level. Trucks conventionally include a sensor rod which trips a valve (not shown) which controls the pressure within the spring 40 so that it is at a relatively high value, for example 55 psig, when the towed vehicle 18 is loaded and at a relatively low value, e.g., 12 psig, when the towed vehicle 18 is not loaded or carries only a relatively small load.

Pressure reducing means 44 are provided for reducing the pressure supplied by the modulating means 29 in opposition to the biasing of the towed vehicle brake valve 34 in response to generation of the second pressure signal by the signal generating means 38 and for not changing the pressure supplied by the modulating means 29 in opposition to the biasing of the towed vehicle brake valve 34 in response to generation of the first pressure signal by the signal generating means 38. The pressure reducing means 44, in the embodiment illustrated in FIG. 2, includes a valve 46 having an open position, as shown in FIG. 2, and a closed position, and being normally biased in the closed position by an appropriate spring 48. The valve 46 is positioned between the pressure modulating means 29 and the towed vehicle brake system 32.

The signal generating means 38 generally includes a conduit 50 communicating the air spring pressure to the valve 46 in opposition to its biasing. The biasing of the valve 46 is adjusted by proper choice of the strength of the spring 48 so that it is overridden by the first pressure signal but is not overridden by the second pressure signal.

Manual overriding means 52 are provided for manually overriding the pressure reducing means 44 when the signal generating means 38 generates the second pressure signal for supplying substantially unreduced pressure (supplied by the modulating means 29) in opposition to the biasing of the towed vehicle brake valve 34. The manual overriding means 52 includes a resolver 54 along with means 56, in the embodiment illustrated a valve, for manually supplying an overriding pressure to the resolver 54. The signal generating means, via the conduit 50, serves for communicating the signal generated thereby to the resolver 54. The resolver 54 is adapted to deliver a greater one of the pressures supplied thereto in opposition to the biasing of the valve 46. Accordingly, whenever the manual overriding means 52 is thrown so as to communicate an adequate pressure, for example 55 psig, to the resolver 54, the valve 46 is forced into its open position as shown in FIG. 2, and the modulated pressure exiting the pressure modulating means 29 is directly applied via conduits 24 and 58 and valve 46 to towed vehicle brake valve 34 in opposition to the biasing thereof.

An indicator light 60 is preferably present along with means 62 which may simply be a conduit connected to a pressure-activated light switch (not shown) and which communicates the pressure exiting the overriding pressure supplying means 56 with the pressure-activated light switch when the pressure applied to the towed vehicle brake valve 34 in opposition to the biasing thereof is a selected one of the pressures supplied by the brake actuator 22 and a lesser value. The indicator light indicates when the overriding means 52 is activated.

The pressure reducing means 44, in the embodiment illustrated, includes a pressure reducing valve 64 having an entry port 66 and an exit port 68. A bypass conduit 70 serves for communicating the pressure from the modulating means 29 to the entry port 66. An auxiliary brake pressurizing circuit 72 communicates pressure from the exit port 68 to the vehicle brake valve 34 in opposition to the biasing thereof.

In the particular embodiment illustrated, the auxiliary brake pressurizing conduit 72 communicates with a resolver 74. The resolver 74 also communicates with and receives the output of the valve 46. The resolver is of a construction sufficient so as to pass the higher of the two pressures which it receives, via a conduit 76, to the conduit 36 which serves as means for applying the pressure supplied by the brake actuator 22 in opposition to the biasing of the towed vehicle brake valve 34.

When the valve 46 is closed, pressure in the conduit 24 flows via the conduit 70 to the pressure reducing valve 64. The pressure in the conduit 70 is applied via a pilot conduit 78 in opposition to the force of a spring 80 which biases the pressure reducing valve 64. Flow is metered through the pressure reducing valve 64 whereby the pressure at the exit port 68 is reduced over the pressure at the entry port 66. As a result, the pressure supplied to the towed vehicle brake valve 34 is reduced whereby that valve is forced against its spring 82 less than would occur if the valve 46 were in its open position. This results in the pressure being applied to the towed vehicle brake system 32 being proportionately less as a result of the fact that the valve 46 is in its closed position. The pressure applied to shift the towed vehicle brake valve 34 is generally proportional to the force applied on the brake actuator 22 whereby the operator of the vehicle 12 retains good road feel.

FIG. 3 illustrates an embodiment very similar to that of FIG. 2. The embodiment of FIG. 3 is particularly useful in those cases wherein the towed vehicle 18 does not have an air spring system. In such an instance, air from the air supply 28 passes through a two-way valve 84, the position of which is changed by movement of a rod 86. When the valve 84 is in the position illustrated in FIG. 3, pressure from the air supply 28 does not pass through it. When the valve 84 is moved leftwardly in FIG. 3, pressure in the air supply 28 passes through the valve 84 and is applied to the resolver 54. The rod 86 is positioned whereby the valve 84 is moved to the open position in response to the load carried by the towed vehicle 18 moving toward the frame 42. The resolver 54 also is connected to receive pressurized air via the means 56 which serves for manually supplying an overriding pressure to the resolver 54. The maximum of the two pressures reaching the resolver 54 is communicated to oppose biasing of pressure reducing means 144 which serves for reducing the pressure supplied by the modulating means 29 in opposition to the biasing of the towed vehicle brake valve 34.

When the pressure reducing means 144, which is in the nature of a valve 146, is in the position illustrated in FIG. 3, pressure controlled by the brake actuator 22, and as modulated via the pressure modulating means 29 proceeds via the conduit 24 and a continuation conduit 148 to the valve 146 and through the valve 146 via a conduit 136 to the towed vehicle brake valve 34 where it acts against a spring 182 urging that valve leftwardly. Meanwhile, a conduit 150 leads from a pressure actuatable light 160 to the atmosphere, also through the valve 144. As a result, the light 160 is not activated.

When the manual overriding means 52 is not being operated (when it is in the position shown in FIG. 3) and when the frame and load are sufficiently separated so that the valve 84 is in the position shown in FIG. 3, the valve 144 shifts leftwardly. This accomplishes two things. First, pressure in the conduit 148 is applied to the pressure actuatable light 160 via the conduit 150 whereby the light 160 is actuated (or deactuated, as the case may be). Second, pressure from the pressure modulating means 29 as controlled by the brake actuator 22, passes via a conduit 170 to an entry port 166 of a pressure reducing valve 164. A reduced pressure exits an exit port 168 of the pressure reducing valve 164 and then passes through the valve 144 and the conduit 136 and is applied in opposition to the biasing of the towed vehicle brake valve 34.

INDUSTRIAL APPLICABILITY

An improved braking apparatus 10 as set forth herein is particularly useful for reducing the braking force applied to the brakes of a towed vehicle 18 when the towed vehicle 18 is not loaded enough so that it is desirable to have such a heavy braking force. Manual override of the system is provided as well as a visual indicator of operation of the system. The manual overriding allows full pressure to be applied to both towing truck brakes and trailer brakes when both are relatively lightly loaded or empty, whereby balanced braking of both truck and trailer results.

While not specifically illustrated, the invention contemplates and covers situations wherein valves are biased so as to apply the various brakes in cases of failure of control lines.

Other aspects, objectives and advantages of this invention can be obtained from a study of the drawings, the disclosure and the appended claims.

I claim:

1. In a braking apparatus (10) for an articulated vehicle (12) having a towing vehicle (14) attached across an articulated joint (16) to a towed vehicle (18) which is adapted to carry a load, said towing vehicle (14) having a towing vehicle brake system (20) which brakes said towing vehicle (14) in an amount determined by the pressure of air supplied thereto, an air supply (28), an operator-controlled brake actuator (22) adapted to control the pressure of air supplied to said towing vehicle brake system (20), a towing vehicle brake valve (26) movable between a first towing vehicle brake valve position which applies pressure to the towing vehicle brake system (20) and a second towing vehicle brake valve position which prevents application of pressure to the towing vehicle brake system (20) and being biased into a respective one of said first and second towing vehicle brake valve positions, means (30) for applying the pressure controlled by the brake actuator (22) in opposition to the biasing of the towing vehicle brake valve (26), the towed vehicle (18) having a towed vehicle brake system (32) which brakes the towed vehicle (18) in an amount determined by the pressure of air supplied thereto, a towed vehicle brake valve (34) movable between a first towed vehicle brake valve position which applies pressure to the towed vehicle brake system (32) and a second towed vehicle brake valve position which prevents application of pressure to the towed vehicle brake system (32) and being biased into a respective one of said first and second towed vehicle brake valve positions, and means (36) for applying the pressure controlled by the brake actuator (22) in opposition to the biasing of the towed vehicle brake valve (34), an improvement comprising:

modulating means (29) for modulating application of pressure from the air supply (28) in response to operator control of said brake actuator (22);

signal generating means (38) for generating a first signal in response to the weight of the load exceeding a selected value and a second signal in response to the weight of the load being less than said selected value;

pressure reducing means (44) for substantially reducing the pressure controlled by the brake actuator (22) and modulated by the modulating means (29) in opposition to the biasing of the towed vehicle brake valve (34) in response to generation of the second signal by the signal generating means (38) and for not substantially reducing the pressure controlled by the brake actuator (22) and modulated by the modulating means (29) in opposition to the biasing of the towed vehicle brake valve (34) in response to generation of the first signal by the signal generating means (38); and manual overriding means (52) for manually overriding the pressure reducing means (44) when the signal generating means (38) generates the second signal for supplying substantially unreduced pressure controlled by the brake actuator (22) and modulated by the modulating means (29) in opposition to the biasing of the towed vehicle brake valve (34).

2. A braking apparatus (10) as set forth in claim 1, wherein said pressure reducing means (44) includes a valve (46) having a first valve position which communicates the pressure controlled by the brake actuator (22) and modulated by the modulating means (29) in opposition to the biasing of the towed vehicle brake valve (34) and a second valve position which prevents such communicating and being normally biased in a respective one of said first and second valve positions, the valve (46) being positioned between the pressure modulating means (29) and the towed vehicle brake system (32), wherein the towed vehicle includes a frame (42), an air spring (40) for suspending the load above the frame (42), air spring pressurizing means for pressurizing the air spring (40) to an air spring pressure which is at a first pressure level in response to the load being suspended above the frame (42) less than a selected distance and at a second pressure level in response to the load being suspended above the frame (42) more than the selected distance, the first pressure level determining the first signal and the second pressure level determining the second signal, wherein the signal generating means (38) includes a conduit (50) communicating the air spring pressure to the valve (46) in opposition to the biasing thereof, and wherein the biasing of the valve (46) is overridden by the first signal but not overridden by the second signal.

3. A braking apparatus (10) as set forth in claim 2, wherein:
said manual overriding means (52) includes a resolver (54) and means (56) for manually supplying an overriding pressure to said resolver (54);
said signal generating means (38) includes a conduit (50) for communicating the signal generated thereby to said resolver (54); and
said resolver (54) is adapted to deliver a greater one of the pressures supplied thereto in opposition of the biasing of the valve (46).

4. A braking apparatus (10) as set forth in claim 2, further including:

a pressure reducing valve (64) having an entry port (66) and an exit port (68);
a biasing conduit (70) communicating the pressure from said brake actuator (22) to said entry port (66); and
an auxiliary brake pressurizing conduit (72) communicating pressure from said exit port (68) to said towed vehicle brake valve (34) in opposition to the biasing thereof.

5. A braking apparatus (10) as set forth in claim 4, wherein:
said manual overriding means (52) includes a resolver (54) and means (56) for manually supplying an overriding pressure to said resolver (54);
said signal generating means (38) includes a conduit (50) for communicating the signal generated thereby to said resolver (54); and
wherein said resolver (54) is adapted to deliver the greater one of the pressures supplied thereto in opposition to the biasing of said valve (46).

6. A braking apparatus (10) as set forth in claim 5, further including:
an indicator light (60); and
means (62) for activating said light (60) in response to the pressure applied to said towed vehicle brake valve (34) in opposition to the biasing thereof being a selected one of the pressures supplied by said modulating means (29) and a lesser value.

7. A braking apparatus (10) as set forth in claim 1, further including:
a pressure reducing valve (64) having an entry port (66) and an exit port (68);
a bypass conduit (70) communicating the pressure from said brake actuator (22) to said entry port (66); and
an auxiliary brake pressurizing conduit (72) communicating pressure from said exit port (68) to said towed vehicle brake valve (34) in opposition to the biasing thereof.

8. A braking apparatus (10) as set forth in claim 7, further including:
an indicator light (60); and
means (62) for activating said light (60) in response to the pressure applied to said towed vehicle brake valve (34) in opposition to the biasing thereof being a selected one of the pressures supplied by said modulating means (29) and a lesser value.

9. A braking apparatus (10) as set forth in claim 8, wherein:
said manual overriding means (52) includes a resolver (54) and means (56) for manually supplying an overriding pressure to said resolver (54);
said signal generating means (38) includes a conduit (50) for communicating the signal generated thereby to said resolver (54); and
said resolver (54) is adapted to deliver a greater one of the pressures supplied thereto in opposition to the biasing of said valve (46).

* * * * *